United States Patent Office 3,546,494
Patented Dec. 8, 1970

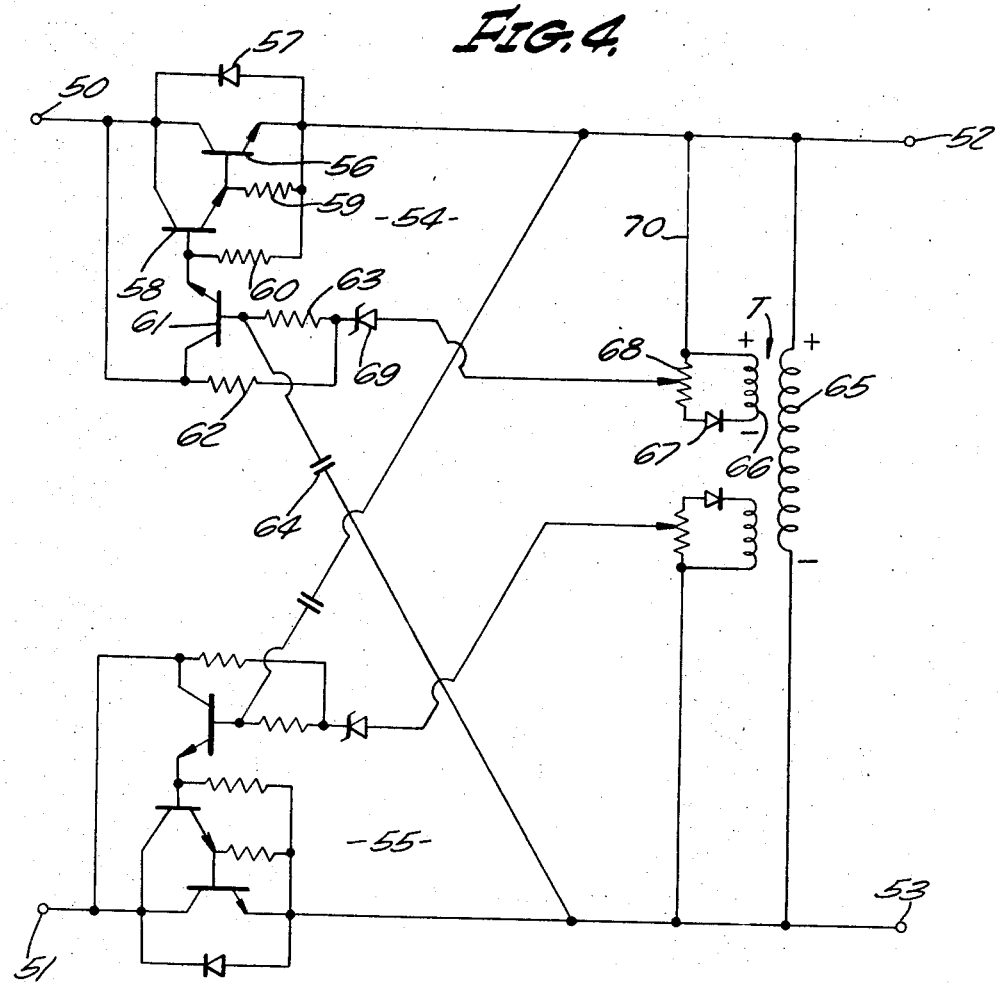

3,546,494
DYNAMIC FILTER
Cravens L. Wanlass, Santa Ana, Calif., assignor to Wanlass Electric Company, Santa Ana, Calif., a corporation of California
Filed July 28, 1966, Ser. No. 568,613
Int. Cl. H03k 1/12
U.S. Cl. 307—297
20 Claims

ABSTRACT OF THE DISCLOSURE

A filter for removing the ripple from a DC voltage in which the base biasing network of a series transistor is provided with two different time constants, a long time constant to permit the base to peak follow the input and a long time constant to prevent the base from following negative going transients in the input. Also disclosed is a dynamic AC filter in which the collector-base circuit of each of a pair of series transistors biases the transistor into saturation except when a high frequency transient is present to the input, a capacitor in the base circuit preventing the base voltage from following the collector voltage in such an instance.

---

This invention relates to filtering circuits and more particularly relates to filtering circuits which employ active solid state components.

The use of motor-generators or motor-alternators as an input power source for electronic equipment is widespread in industry because it has been found that this is a most effective way to remove high voltage transients that are associated with the power received by normal power distribution lines from the utility companies. A motor-generator or motor-alternator is useful in such applications because they each have considerable mechanical momentum when in operation. Consequently, short duration, high-voltage transients on the line have little effect at the output of the generator or alternator since the average power content of such transients is small and the momentum of the heavy mechanical mass tends to smooth out the high-voltage impulses and see only the average power. This action is similar to the use of a fly wheel on an automobile engine to even out the individual power pulses of the pistons and allow smooth operation of the unit.

While such apparatus is satisfactory from a performance standpoint, this type of filtering has several serious drawbacks, most importantly the high weight and high cost of the apparatus. As a result, various attempts have been made to devise electronic filters for such transients. These attempts have been both technically and economically unsuccessful because their proposed solution of the problem has been to use large capacitor-inductor passive combinations as filters. Such combinations, however, are unsatisfactory because of phase shift and their very poor filtering characteristics at low frequencies, and because of the considerable weight of such combinations. For example, most passive line filters have a low frequency cutoff of 20 kilocycles and thus most of the power line noise caused by lightning or man-made voltage transients produced by the firing of silicon controlled rectifiers or the like are not filtered out. These high voltage transients can result in pemanent damage to electronic equipment if they are not removed.

It is therefore an object of the present invention to provide filter circuits employing active solid state components.

It is also an object of the present invention to provide a dynamic filter of light weight, low cost, and excellent low and high frequency filtering characteristics.

It is another object of the present invention to provide a circuit for removing higher frequency components from a voltage having a desired lower frequency component as well as said higher frequency components.

It is a further object of the present invention to provide a filter circuit employing transistors and resistance-capacitance networks for removing transients from a line voltage.

These and other objects and advantages of the present invention will be more apparent upon reference to the accompanying description and drawings in which:

FIG. 3 is a schematic diagram of a second embodiment of a filter circuit according to the present invention;

FIG. 4 is a schematic diagram of a filter and regulator circuit according to the present invention;

FIG. 6 is a schematic diagram of a modification of the ripple filter circuit of FIG. 5.

Briefly, the present invention accomplishes the objects set forth above by utilizing a transistor in the line which is biased into a suitable conductive state by biasing means connected between its collector and base. The base of the series transistor is connected to the opposite side of the load circuit by a capacitor. By providing the base circuit including the capacitor with a time constant that is large compared to the duration of the undesired higher frequency voltage components, the voltage associated with the capacitor will tend to keep the base voltage constant, resulting in the undesired voltage components being dissipated in the collector resistance of the transistor. The voltage at the emitter will be held essentially constant during the duration of the undesired components by the base and thus the unwanted components do not appear at the output nor across the load. By facing the emitter of the transistor toward the load, a low-frequency response transistor can be used while still accomplishing good filtering at the high frequencies associated with the voltage transient.

The undesired higher frequency components that can be removed according to the present invention may be of the type found in power lines caused by silicon controlled rectifier spikes or the like, in which case the desired lower frequency component is generally the 60 cycle/second component, or they may be of relatively low frequency, for example the 60 cycle/second ripple on a DC power supply. In the later case, of course, the desired lower frequency component is the DC component. In the former case, the series transistor is preferably biased into or close to saturation and the base circuit provided with a time constant such that the base will follow 60 cycle amplitude variations in the input voltage, but not variations caused by the higher frequency components of the input voltage. When such a variation is presented at the collector of the transistor, it will drive the transistor out of saturation with the result that the collector resistance will increase and the voltage spike will be dissipated in the increased collector resistance.

In the case of the ripple filter it is desired that none of the pulsating voltage variations appearing at the collector be passed to the load. To accomplish this, it is necessary that the series transistor always be operated out of saturation. This operation is achieved by maintaining the collector-base bias at a value sufficient to insure that the transistor is not driven into saturation as a result of voltage fluctuations at the collector. The base circuit time constant is established such that the base cannot follow even low frequency fluctuations such as are caused by 60 cycle ripple.

Figure 1:
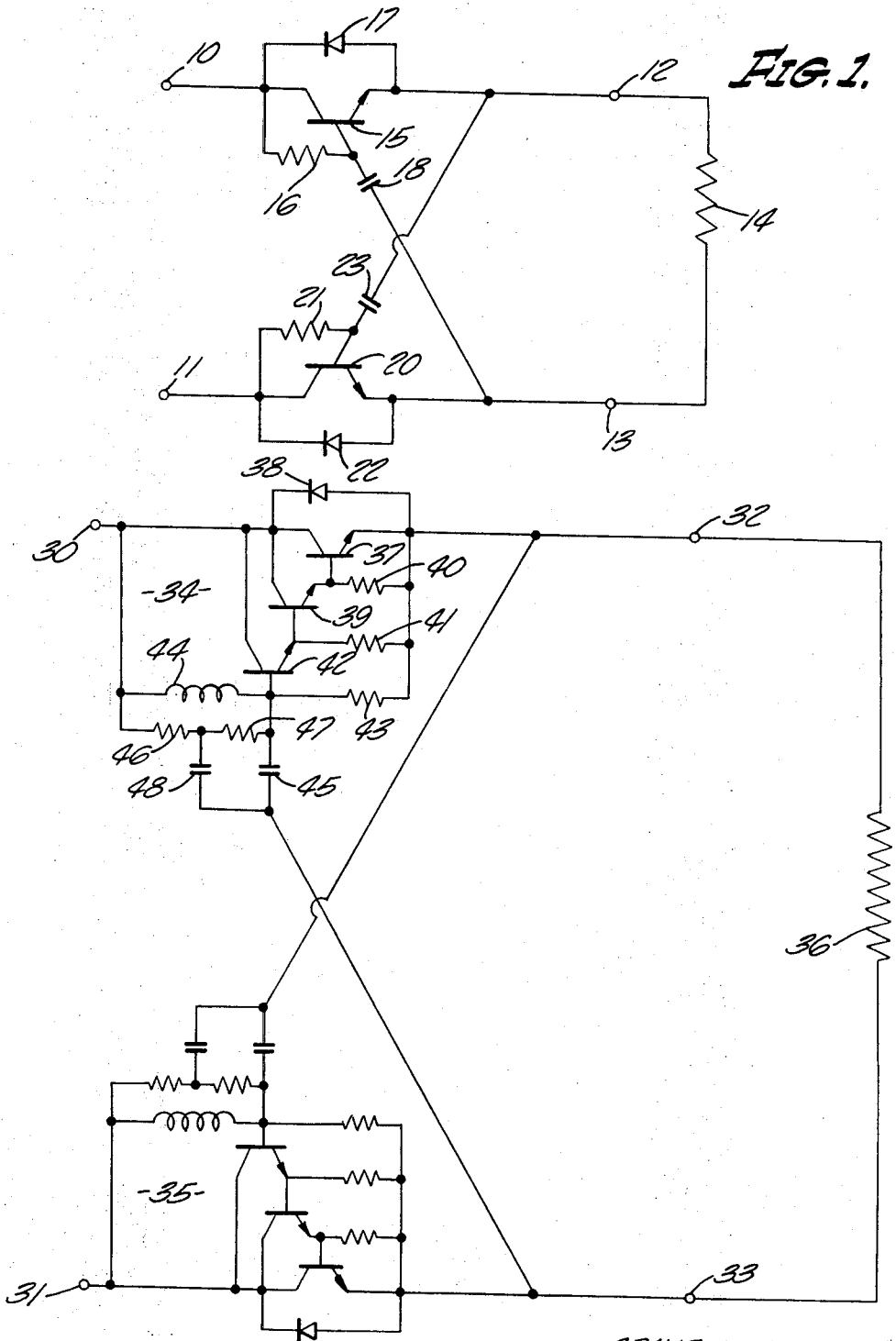
FIG. 1 is a schematic diagram of a first embodiment of a filter circuit according to the present invention.

Turning now to FIG. 1, there is shown a first filter circuit according to the present invention. In this circuit, a pair of input terminals 10 and 11 are connected to a source of AC voltage and a pair of output terminals 12 and 13 are coupled to a load 14. An NPN transistor 15 has its collector connected to the input terminal 10 and its emitter connected to the output terminal 12. A resistor 16 connects the collector and base of the transistor 15. A diode 17 is connected across the collector-emitter path of the transistor 15, the diode 17 being poled oppositely to the transistor 15. The base of the transistor 15 is connected to the opposite side of the load 14, that is, to the output terminal 13, by a capacitor 18.

In a similar fashion, a second NPN transistor 20 has its collector connected to the input terminal 11 and its emitter connected to the output terminal 13. A resistor 21 connects the collector of the transistor 20 with its base and a diode 22 is connected across the collector-emitter path of the transistor 20, the diode 22 being poled oppositely to the transistor 20. A capacitor 23 connects the base of the transistor 20 to the opposite side of the load, that is, to the output terminal 12.

The operation of the circuit can be explained as follows. Assume first that no line transient is present during the first half-cycle of the input voltage and that input terminal 10 is positive and input 11 negative. In this case, current flows from input terminal 10 through transistor 15, held in or close to saturation by the current flowing through the resistor 16, through the load 14, then through the diode 22 and out terminal 11. During the second half cycle, the terminal 11 is positive and terminal 10 is negative. In this case, the current flows from terminal 11 through transistor 20, held in or near saturation by the resistor 21, through the load 14, then through diode 17 and out terminal 10. As can be seen, in each half cycle the current has to pass through only one diode and one saturated or nearly saturated transistor. Consequently, very little loss is exhibited in the filter and it is very efficient. Furthermore, very little distortion is added to the input wave form by the filter.

Now assume that a large voltage transient is introduced to the filter circuit on the input wave form. Assuming the terminal 10 to be positive, the wave form goes into the filter and arrives at the collector of transistor 15. The voltage transient causes the collector voltage of the transistor 15 to increase abruptly and attempts to cause the base of the transistor to also increase abruptly. However, a capacitor 18 is connected to the base and the opposite side of the load. Thus, the base of transistor 15 cannot increase abruptly since to do so it must alter the charge on the capacitor 18. Since this charge can only be altered in accordance with the time constant $R_{16}$–$C_{18}$, by making this time constant large compared to the duration of the pulse or transient, the voltage associated with the capacitor 18 tends to keep the base voltage constant. The transistor 15 is consequently pulled out of saturation and the voltage transient is dissipated in the increased collector resistance of the transistor 15. The voltage at the emitter of the transistor 15 is held essentially constant during this fast transient by the base and thus the transient does not appear at the output and is not seen across the load. The current then passes through the diode 22 and out the terminal 11.

As can be seen, the frequency characteristics of the filter circuit are basically determined by the values of resistor 16-capacitor 18 and resistor 21-capacitor 23. The effective capacitance noted at the emitter of the transistor 15 is that of the capacitor 18 multiplied by the current gain of the transistor 15. Thus, the voltage transient effectively sees a very large capacitance between the emitter and the other side of the load, in other words, it appears that the load is shunted by a very large capacitor. The collector resistance is in series with this effective capacitance and thus all the transient is dissipated in the collector resistance. Since diode 22 was conducting all during the half cycle, the turn-on or forward conduction characteristics of this diode are of little concern.

It is important for the operation of the circuit that the emitters of the transistors 15 and 20 which filter out the voltage transient are arranged facing the load. This allows the use of low frequency response transistors in the circuit and still results in very good filtering at the high frequencies associated with the voltage transient.

Typical values for a circuit constructed in accordance with FIG. 1 are as follows:

Transistors 15 and 20: 2N3055
Resistors 16 and 21: 1.9K ohms
Capacitors 18 and 23: 0.1 microfarad
Diodes 17 and 22: Westinghouse 368D
Load resistor 14: 100 ohms
AC input voltage: 117 v., 60 cycles/sec.

Figure 2:
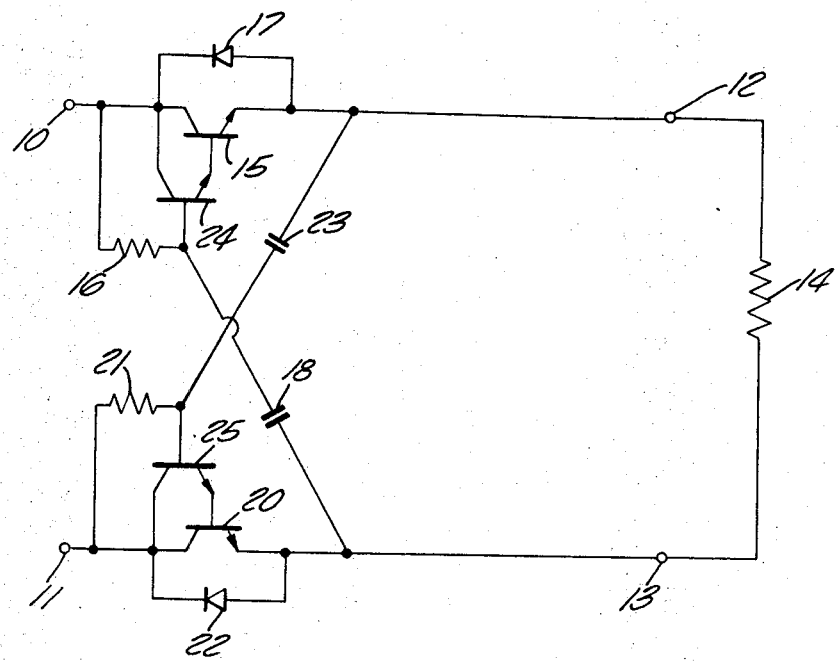
FIG. 2 is a schematic diagram of a modification of the filter circuit of FIG. 1.

FIG. 2 shows a circuit similar to FIG. 1 which permits the size of the capacitors 18 and 23 to be reduced. In this figure, similar elements are identified by the same reference numerals used in FIG. 1. As can be seen, the only difference between this circuit and the circuit of FIG. 1 is the addition of NPN transistors 24 and 25. The transistor 24 is connected as an emitter follower and has its emitter connected to the base of the transistor 15 its collector connected to the collector of the transistor 15 and its base connected to the junction of the resistor 16 and capacitor 18. The transistor 25 is also connected as an emitter follower and has its emitter connected to the base of transistor 20, its collector connected to the collector of the transistor 20, and its base connected to the junction of the resistor 21 and the capacitor 23.

The operation of this circuit is identical to that of the circuit of FIG. 1 with the exception that in this case the effective capacitance across the load is equal to the current gains of the two transistors multiplied together and then multiplied by the capacitance. For example, if the current gain of the transistor 15 is 40, the current gain of the transistor 24 is 50, and the capacitance of the capacitor 18 is one microfarad, then the effective capacitance across the load equals 40×50×1=2,000 microfarads.

The circuit of FIG. 2 illustrates the cost advantages of the present circuit. Instead of the large cost of a non-electrolytic AC 2000 microfarad capacitor with a 600 volt rating, this circuit requires only two transistors and a one microfarad capacitor, the total cost of which is relatively small. Additional amplification can, of course, be added if deemed advisable by the addition of another emitter follower.

Typical values for a circuit constructed in accordance with FIG. 2 are as follows:

Transistors 15 and 20: 2N3055
Transistors 24 and 25: 2N3054
Resistors 16 and 21: 1.0K ohms
Capacitors 18 and 23: 0.04 microfarad
Load resistance 14: 20 ohms
AC input voltage: 117 v., 60 cycles/sec.

Turning now to FIG. 3 there is shown another embodiment of the present invention which is an improvement over the circuits of FIGS. 1 and 2 in that it has better frequency characteristics and allows better attenuation factors or roll off characteristics. In this circuit, input terminals 30 and 31 are connected to output terminals 32 and 33 by filtering networks 34 and 35 respectively. Any suitable load 36 can be connected across the output terminals 32 and 33. The filtering networks 34 and 35 are identical and thus the structure and operation of only one of them will be explained in detail.

An NPN transistor 37 has its collector connected to the input terminal 30 and emitter connected to the output terminal 32. The collector-emitter path of the transistor 37 is shunted by a diode 38 poled in the direction opposite to the transistor 37. An emitter follower transistor 39 has its emitter connected to the base of the transistor 37 and its collector connected to the collector to transistor 37. The base of the transistor 37 is connected to its emitter by a resistor 40, while the base of the transistor 39 is connected to its emitter by a resistor 41 and the resistor 40. A further transistor 42 also coupled as an emitter follower has its emitter connected to the base of the transistor 39 and its collector connected to the collector of the transistor 37. A resistor 42, together with the resistor 41, connects the base of transistor 42 with its emitter.

The base of the transistor 42 is also connected to the input terminal 30 by an inductance 44, and connected to the opposite side of the load, that is, to the output terminal 33, by a capacitor 45. A pair of resistors 46 and 47 are connected across the inductor 44 and a capacitor 48 is connected across the resistor 47 and capacitor 45.

The operation of this circuit is basically similar to the operation of the circuits of FIGS. 1 and 2. The emitter follower transistors 39 and 42 serve the same function as the emitter follower transistor 24 in FIG. 2, that is, increasing the overall gain. The capacitor 45 serves the same purpose as the capacitor 18 of FIG. 1, that is, it tends to hold the base of the transistor 42 constant during any transients that appear at the input terminal 30. The inductor 44 serves the same purpose as the resistor 16 of FIG. 1, that is, the current flowing through it serves to hold the transistor 42, and ultimately the power transistor 37, in or close to saturation. However, the use of the inductor 44 instead of a resistor has the advantage that at low frequencies the impedance between the collector and the base is negligible so that the transistor 37 is held in or near saturation at 60 cycles. This results in a reduction of the power loss in the filter. At high frequencies, the impedance of the inductor 44 increases so that its attenuation is more pronounced.

The resistors 46 and 47 and the capacitor 48 are inserted to perform a damping function and prevent oscillation or ringing of the LC circuit made up of the inductor 44 and capacitor 45. The resistors 40, 41 and 43 are provided to assist in cutting off the transistors 37, 39 and 41 respectively. When these transistors are cut off, current flows out of the base and into the emitter of the respective transistors causing them to be cut off more rapidly than would be the case if the resistors were not present. However, these resistors can be deleted if desired. The diode 38, of course, serves to by-pass the filter network 34 when the polarity of the input voltage is reversed.

Typical values for a circuit constructed in accordance with FIG. 3 are as follows:

Transistor 37: 2N3773
Transistor 39: 2N3441
Transistor 42: RCA40321
Capacitors 45 and 48: 1.0 microfarad
Resistors 46 and 47: 130 ohms
Inductor 44: 70 millihenries
Diode 38: Westinghouse 368D Turning now to FIG. 4, there is illustrated a circuit in which a filter circuit according to the present invention is employed together with a peak voltage regulator circuit to result in a unit that not only eliminates high voltage transients but limits the peak voltage of the output in the event that the input line voltage becomes higher than desired.

In the circuit of FIG. 4, a pair of input terminals 50 and 51 are connected to a pair of output terminals 52 and 53 by regulating and filtering networks 54 and 55 respectively. Since networks 54 and 55 are identical, only the construction and operation of the network 54 will be explained in detail. An NPN transistor 56 has its collector connected to the input terminal 50 and its emitter connected to the output terminal 52. A diode 57 is connected across the connector-emitter path of the transistor 56 and is poled in the opposite direction to the transistor 56. A second NPN transistor 58 is connected as an emitter follower with its emitter connected to the base of the transistor 56 and its collector connected to the collector of the transistor 56. A resistor 59 connects the emitter of the transistor 56 to its base while a resistor 60 connects the emitter of the transistor 58 to its base.

A third transistor 61, also connected as an emitter follower, has its collector connected to the collector of the transistor 56 and its emitter connected to the base of the transistor 58. The collector of the transistor 61 is connected to its base to resistor 62 and 63. The base of the transistor 61 is connected to the opposite output terminal 53 by a capacitor 64. The primary winding 65 of a transformer T is connected between the output terminals 52 and 53. A first secondary winding 66 of the transformer T has its output connected by a diode 67 across a potentiometer 68. The wiper of the potentiometer 68 is connected to the junction of the resistors 62 and 63 by a Zener diode 69. The upper end of the secondary winding 66 and the potentiometer 68 are connected to the emitter of the transistor 56 by conductor 70.

The operation of the circuit of FIG. 4 can be explained as follows. Assume first that the instantaneous polarity of the input voltage at the input terminal 50 is positive and that the peak voltage of the input is less than the predetermined maximum value. If this is the case, the Zener diode 69 will not conduct and the circuitry including the transistors 65, 58 and 61 will operate in precisely the same manner as heretofore described. In this circuit, the RC network made up of the resistors 62 and 63 and the capacitor 64 acts in the same manner as the resistor 16 and capacitor 18 of FIG. 1 to maintain the base of the transistor 61, and consequently the base of transistor 56, at a constant potential so that if any voltage transients appear, they will be dissipated in the collector resistance of the transistor 56 in the same manner as in the previously described circuits.

Assume now that the input voltage begins to rise. This rise in voltage is reflected across the primary of the transformer T with the result that an increased voltage is induced by a secondary winding 66 and presented across the potentiometer 68. Since the potentiometer 68 is referenced to the emitter of transistor 56, the wiper arm of potentiometer 68 becomes more negative, resulting in an increased voltage drop across the Zener diode 69 which, as determined by the setting of the wiper of potentiometer 68, will cause it to break down and the voltage at the base of transistor 61 to be held constant. Current passing through the resistor 62 will be diverted through the Zener diode 69 and away from the base of the transistor 61 causing it to become less conductive. This in turn causes the transistors 58 and 56 to be less conductive with the result that there is a greater voltage drop across the transistor 56 and the voltage across the output terminals 52 and 53 is decreased. The Zener diode 69 will hold the base of transistor 61 at a constant potential until the instantaneous value of the input voltage drops below the preset peak voltage. The diode 69 will then become nonconductive and the network 54 will operate in the filtering mode. The resistor 63 is not necessary to the operation of the circuit but is desirable to limit the current and to isolate the capacitor 64 from the Zener diode 69.

Figure 5:
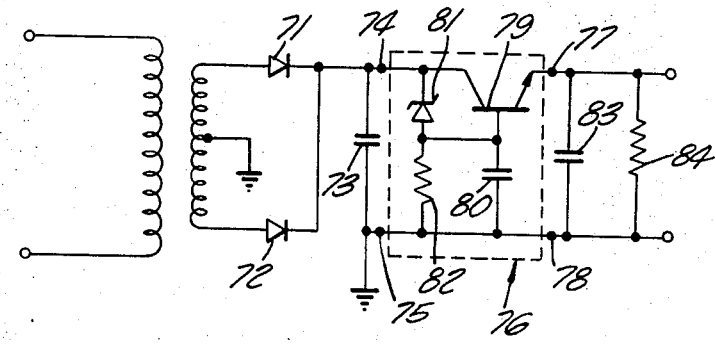
FIG. 5 is a schematic diagram of a ripple filter circuit according to the present invention.

Turning now to FIG. 5, there is shown a rippel filter circuit constructed in accordance with the present invention. In this circuit, an AC voltage is rectified by diodes 71 and 72 and filtered by a capacitor 73 in the conventional manner. A rectified and filtered voltage is thus presented at input terminals 74 and 75 of a filtering network generally indicated at 76 and having output terminals 77 and 78. An NPN transistor 79 has its collector connected to the input terminal 74 and its emitter connected to the output terminal 77. The base of the transistor 79 is connected to the other output terminal 78 by a capacitor 80 and is also connected to the collector of transistor 79 by a Zener diode 81. A resistor 82 connects the output terminal 78 as shown here, at ground potential. An additional filtering capacitor 83 is connected across the output terminal 77 and 78 as is a load resistor 84.

The Zener breakdown voltage of the Zener diode 81 is selected such that it is greater than the peak-to-peak voltage of the ripple at the input terminal 74 by enough to maintain the transistor 79 operating Class A, that is, out of saturation. Thus, the input voltage appearing at the input terminals 74 and 75 and across the Zener diode 81 and resistor 82, peak charges the capacitor 80 to a voltage equal to the maximum voltage appearing at the terminal 74 minus the Zener voltage of the Zener diode 81. In other words, the Zener diode is caused to conduct and increase the charge on the capacitor 80 during any portion of the input cycle that the voltage appearing at the point 74 exceeds the voltage stored by the capacitor 80 and the Zener voltage of the Zener diode 81. Since the Zener voltage is larger than the ripple peak-to-peak voltage, if the time constant associated with the capacitor 80 and transistor 79 is made large, the voltage across the capacitor 80 reaches a DC value with very little ripple.

This essentially constant DC voltage at the base of the transistor 79 causes the voltage at the emitter of the transistor to also remain substantially constant, that is, with no ripple. As was the case with the circuits previously described, when the base is held at a constant voltage and the voltage at the collector increases, the collector resistance also increases and the voltage fluctuation is dissipated in the increased collector resistance. Thus, a DC voltage with virtually no ripple appears across the output terminals 77 and 78 and the load 84. The capacitor 83 is provided to stabilize the transistor 79 and prevent oscillation. The resistor 82 is not required for the operation of the circuit which will function well without it. It is useful, however, in those instances where it is desired to alter the voltage across the capacitor 80 to maintain a constant output voltage regardless of changes in the base-emitter drop of transistor 79 caused by variations in load current. If desired, the Zener diode 81 can be replaced by a plurality of regular diodes using the combined forward voltage drop for the same effect as the Zener voltage.

Typical values for a circuit constructed in accordance with FIG. 5 are as follows:

Transistor 79: 2N3055
Resistor 82: 10K ohms
Capacitor 80: 1000 microfarads
Capacitor 73: 5000 microfarads
Capacitor 83: 250 microfarads
Load resistance 84: 2 ohms
Diodes 71 and 72: Westinghouse 368D
Input voltage: 10 volts DC
Zener diode 81: 3.9 volts (VZ)

As was the case with the circuit of FIG. 1, additional gain may be achieved by the use of an emitter follower stage. Such a circuit is shown in FIG. 6, the same reference numerals used in FIG. 5 being used for the same elements. In this circuit, an additional NPN transistor 85 is provided having its collector connected to the collector of the transistor 79 and its emitter connected to the base of the transistor 79. The base of the transistor 85 is connected to the junction of the Zener diode 81 and the capacitor 80. The operation of this circuit is exactly the same as the operation of the circuit of FIG. 5 with the exception that there is greater current gain and thus the effective time constant of the circuit can be made very large which is desirable in such a ripple filter.

From the foregoing description, it can be seen that a filter circuit has been provided that is lightweight and constructed of relatively inexpensive components. While various circuit components have been assigned typical values in the described circuits it should be understood that these values are illustrative only and not limiting. For example, PNP transistors may be used by reversing the polarity of all the diodes. While the circuits of the present invention have been described in connection with preventing the passage of voltage transients to a load, it should be obvious that other applications of the circuits fall within the scope of the present invention. For example, the filter of the present invention can be used to prevent noise generated by various load systems from entering the power lines. This can be accomplished by reversing the circuits so that the emitters of the power transistors are connected to the power line. The circuit will then eliminate any noise generated by the load from entering the power line. In addition, two units may be connected together in a back-to-back relationship so that noise pulses cannot be transmitted from the line into the load or from the load to the line. Consequently, the terms "input terminals" and "output terminals" as used in the claims are to be accorded their broadest interpretations, that is, the terminals at which the signal of interest enters and leaves the circuit respectively.

The invention may be embodied in other specific forms not departing from the spirit or central characteristics thereto. The present embodiments are therefore to be considered in all respects as illustrative and not restrictive, the scope of the invention being indicated by the appended claims rather than by foregoing descriptions, and all changes which come within the meaning and range of equivalency of the claims are therefore intended to be embraced therein.

I claim:
1. A filtering circuit comprising:
a pair of input terminals for receiving an AC voltage,
a pair of output terminals,
first and second transistors each having an emitter, a collector and a base,
means connecting said collector of said first transistor to one of said input terminals,
means connecting said emitter of said first transistor to one of said output terminals,
means connecting said collector of said second transistor to the other of said input terminals,
means connecting said emitter of said second transistor to the other of said output terminals,
first diode means connected across the collector-emitter path of said first transistor, said first diode means being poled to conduct when the instantaneous polarity of said AC voltage at said first input terminal is negative,
second diode means connected across the collector-emitter path of said second transistor, said second diode means being poled to conduct when the instantaneous polarity of said AC voltage at said second input terminal is negative,
means connecting said collector of said first transistor to said base thereof, said means comprising first inductance means normally biasing said first transistor into saturation upon current flow to the collector thereof,
means connecting said base of said first transistor to said second output terminal, said means comprising first capacitor means, said first capacitor means and said first inductance means forming a network having a long time constant whereby the voltage at said base of said first transistor is prevented from following rapid changes in voltage at said collector of said first transistor and said first transistor goes out of saturation upon the occurrence of such a rapid change,
means connecting said collector of said second transistor to said base thereof, said means comprising second inductance means normally biasing said second transistor into saturation upon current flow to the collector thereof, and
means connecting said base of said second transistor to said first output terminal, said means comprising second capacitor means, said second capacitor means and said second inductance means forming a network having a long time constant whereby the voltage at said base of said second transistor is prevented from following rapid changes in voltage at said collector of said second transistor and said second transistor goes out of saturation upon the occurrence of such a rapid change.

2. The filtering circuit of claim 1 wherein said means connecting said collector of said first transistor to the base thereof further comprise a third transistor having an emitter connected to said base of said first transistor, a collector connected to the collector of said first transistor and a base, said first inductance means and said first capacitor means being connected to said base of said third transistor, and wherein said means connecting said collector of said second transfer to the base thereof further comprise a fourth transistor having an emitter connected to said base of said second transistor, a collector connected to said collector of said second transistor and a base, said second inductance means and said second capacitor means being connected to said base of said fourth transistor.

3. The circuit of claim 1 wherein further impedance means are provided for preventing ringing of each of the LC circuits made up of respective inductive means and capacitor means.

4. The circuit of claim 1 further provided with first means connected to said output terminals and to said base of said first transistor for varying the conduction of said first transistor when the voltage across the output terminal exceeds a predetermined value, and with second means connected to said output terminals and to said base of said second transistor for varying the conduction of said second transistor when the voltage across the output terminal exceeds a predetermined value.

5. A circuit of claim 4 wherein each of said conduction varying means comprises a Zener diode.

6. A filtering circuit comprising:
a pair of input terminals for receiving an AC voltage,
a pair of output terminals,
a first filtering network connected between a first of said input terminals and a first of said output terminals,
a second filtering network connected between the other of said input terminals and the other of said output terminals,
each of said first and second filtering networks comprising:
a first transistor having an emitter, a collector and a base,
means connecting said collector of said first transistor to its respective input terminal,
means connecting said emitter of said first transistor to its respective output terminal,
diode means connected across the collector-emitter path of said first transistor, said diode means being poled to conduct when the instantaneous polarity of said AC voltage at its respective input terminal is negative,
a second transistor having a collector connected to the collector of said first transistor, an emitter connected to the base of said first transistor, and a base,
a third transistor having a collector connected to the collector of said first transistor, an emitter connected to the base of said second transistor, and a base,
an inductor connecting the collector of said first transistor to the base of said third transistor,
a capacitor connecting said base of said third transistor to the opposite output terminal, said inductor and said capacitor forming a network having a time constant long relative to transients in said AC voltage whereby the voltage at said base of said third transistor and consequently at the base of said first transistor is prevented from following the transients in the voltage appearing at said collector of said first transistor.

7. The filtering circuit of claim 6 wherein an RC network is coupled to said long time constant network to prevent ringing thereof.

8. A filtering and regulating circuit comprising:
a pair of input terminals for receiving an AC voltage,
a pair of output terminals,
a first filtering and regulating network connected between a first of said input terminals and a first of said output terminals,
a second filtering and regulating network connected between the other of said input terminals and the other of said output terminals,
each of said first and second filtering and regulating networks comprising:
a first transistor having an emitter, a collector and a base, means connecting said collector of said first transistor to its respective input terminal,
means connecting said emitter of said first transistor to its respective output terminal,
diode means connected across the collector-emitter path of said first transistor, said diode means being poled to conduct when the instantaneous polarity of said AC voltage at its respective input terminal is negative,
a second transistor having a collector connected to the collector of said first transistor, an emitter connected to the base of said first transistor, and a base,
a third transistor having a collector connected to the collector of said first transistor, an emitter connected to the base of said second transistor, and a base,
an inductor connected between said collector of said first transistor and said base of said third transistor to cause said first transistor to normally be biased into saturation,
a capacitor connected between said base of said third transistor and the opposite output terminal, said inductor and said capacitor forming a network having a long time constant relative to transients in said AC voltage whereby the voltage at the base of said third transistor and consequently at the base of said first transistor is prevented from following transients in the voltage appearing at the collector of said first transistor and said first transistor goes out of saturation upon the occurrence of such a transient,
means for sensing the magnitude of the voltage across said output terminals, and
a Zener diode connecting said base of said third transistor to said output voltage sensing means, said Zener diode being rendered conductive when said output voltage exceeds a predetermined value whereby the conduction of said third transistor is varied and consequently said first transistor goes out of saturation to reduce the voltage appearing across said output terminals.

9. The circuit of claim 8 wherein said output voltage sensing means comprises: a transformer having a primary winding connected between said output terminals and having a secondary winding; a potentiometer connected across said secondary winding; said Zener diode being connected to the wiper arm of said potentiometer; and means connecting one end of said secondary winding to said emitter of said first transistor.

10. A filter circuit comprising:
a pair of input terminals for receiving a DC voltage having an AC component thereon;
a pair of output terminals;
a transistor having an emitter, a collector and a base;
means connecting said collector to one of said input terminals;
means connecting said emitter to one of said output terminals;
diode means connecting said collector to said base, said diode means having a voltage drop thereacross greater than the peak-to-peak value of said AC component whereby said transistor is prevented from saturating;

a capacitor connecting said base to the other of said output terminals, said capacitor being charged through said diode means to the peak voltage appearing at said one input terminal, and having a time constant long relative to said AC component whereby said base is prevented from following the voltage fluctuations of said collector caused by said AC component.

11. The circuit of claim 10 wherein a resistor is connected in parallel with said capacitor.

12. The circuit of claim 10 wherein said means connecting said collector to said base further comprise a second transistor having an emitter connected to the base of said first transistor, a collector connected to the collector of said first transistor, and a base, said diode means and said capacitor means being connected to said base of said second transistor.

13. The circuit of claim 10 wherein said diode means comprises a Zener diode.

14. A filtering circuit comprising:
a pair of input terminals for receiving an AC voltage,
a pair of output terminals,
first and second transistors each having an emitter, a collector and a base,
means connecting said collector of said first transistor to one of said input terminals,
means connecting said emitter of said first transistor to one of said output terminals,
means connecting said collector of said second transistor to the other of said output terminals,
means connecting said emitter of said second transistor to the other of said output terminals,
first diode means connected across the collector-emitter path of said first transistor, said first diode means being poled to conduct when the instantaneous polarity of said AC voltage at said first input terminal is negative,
second diode means connected across the collector-emitter path of said second transistor, said second diode means being poled to conduct when the instantaneous polarity of said AC voltage at said second input terminal is negative,
means connecting said collector of said first transistor to said base thereof, said means comprising first inductance means biasing said first transistor into heavy conduction upon current flow to the collector thereof,
means connecting said base of said first transistor to said second output terminal, said means comprising first capacitor means, said first capacitor means and said first inductance means forming a network having a long time constant whereby the voltage at said base of said first transistor is prevented from following rapid changes in voltage at said collector of said first transistor,
means connecting said collector of said second transistor to said base thereof, said means comprising second inductance means biasing said second transistor into heavy conduction upon current flow to the collector thereof, and
means connecting said base of said second transistor to said first output terminal, said means comprising second capacitor means, said second capacitor and said second inductance means forming a network having a long time constant whereby the voltage at said base of said second transistor is prevented from following rapid changes in voltage at said collector of said second transistor.

15. A circuit for removing higher frequency components from a voltage having a desired lower frequency component and said higher frequency components comprising:
a pair of input terminals for receiving said voltage,
a pair of output terminals,
a transistor having a collector, an emitter and a base,
means connecting said collector to one of said input terminals,
means connecting said emitter to one of said output terminals,
inductance means connecting said collector to said base to establish a biasing voltage between said collector and said base, and
means connecting said base to the other of said output terminals, said means comprising capacitor means for preventing the voltage at said base from following rapid voltage changes caused at said collector by said higher frequency components.

16. A filtering circuit comprising:
a pair of input terminals for receiving an AC voltage,
a pair of output terminals,
a transistor having an emitter, a collector and a base,
means connecting said collector to one of said input terminals,
means connecting said emitter to one of said output terminals,
means connecting said collector to said base, said means comprising inductance means causing said transistor to be biased into conduction upon current flow to said collector, and
means connecting said base to the other of said output terminals, said means comprising capacitor means tending to prevent the voltage at said base from following rapid voltage changes at said collector.

17. The filtering circuit of claim 16 wherein said means connecting said collector to said base further comprise a second transistor having an emitter connected to said base of said first transistor, a collector connected to the collector of said first transistor and a base of said second transistor.

18. The circuit of claim 16 where further impedance means are provided for preventing ringing of the LC circuit made up of said inductive means and said capacitor means.

19. The circuit of claim 16 further provided with means connected to said output terminals and to said base of said transistor for varying the conduction of said transistor when the voltage across said output terminals exceeds a predetermined value.

20. The circuit of claim 19 wherein said conduction varying means comprises a Zener diode.

References Cited

UNITED STATES PATENTS

| | | | |
|---|---|---|---|
| 2,801,346 | 7/1956 | Rongen | 317—33 |
| 3,103,617 | 9/1963 | Schneider et al. | 307—297 |
| 3,106,674 | 10/1963 | Hamilton | 317—33 |
| 3,197,634 | 7/1965 | Waters | 307—297 |
| 3,259,803 | 7/1966 | Battista | 317—33 |
| 3,308,373 | 3/1967 | Shaum | 317—31 |
| 3,309,596 | 3/1967 | Limley | 307—297 |
| 3,340,404 | 9/1967 | Willems | 307—297 |
| 3,343,036 | 9/1967 | Steen | 307—297 |
| 3,366,871 | 1/1968 | Connor | 317—31 |
| 3,395,317 | 7/1968 | Hanson | 317—33 |

DONALD D. FORRER, Primary Examiner

H. A. DIXON, Assistant Examiner

U.S. Cl. X.R.

317—33; 323—22; 307—315